(12) United States Patent
Waseda

(10) Patent No.: US 11,063,300 B2
(45) Date of Patent: Jul. 13, 2021

(54) ALL-SOLID-STATE BATTERY

(71) Applicant: TOYOTA JIDOSHA KABUSHIKI KAISHA, Toyota (JP)

(72) Inventor: Tetsuya Waseda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 34 days.

(21) Appl. No.: 16/185,153

(22) Filed: Nov. 9, 2018

(65) Prior Publication Data
US 2019/0214684 A1    Jul. 11, 2019

(30) Foreign Application Priority Data

Jan. 9, 2018   (JP) .............................. JP2018-001317

(51) Int. Cl.
*H01M 10/0585*   (2010.01)
*H01M 10/0562*   (2010.01)
(Continued)

(52) U.S. Cl.
CPC ....... *H01M 10/0585* (2013.01); *H01M 4/134* (2013.01); *H01M 4/386* (2013.01); *H01M 10/0525* (2013.01); *H01M 10/0565* (2013.01); *H01M 50/116* (2021.01); *H01M 50/183* (2021.01); *H01M 2004/027* (2013.01); *H01M 2300/0065* (2013.01); *H01M 2300/0082* (2013.01)

(58) Field of Classification Search
CPC .......... H01M 10/0565; H01M 10/056; H01M 10/0585; H01M 50/183; H01M 50/184; H01M 50/186
See application file for complete search history.

(56) References Cited

U.S. PATENT DOCUMENTS 6,645,675 B1 *   11/2003   Munshi ................. H01B 1/122
                                                       252/62.2
2008/0003493 A1 *   1/2008   Bates ................. H01M 50/557
                                                       429/66
(Continued)

FOREIGN PATENT DOCUMENTS

JP   2000-106154 A   4/2000
JP   2000-251858 A   9/2000
(Continued)

*Primary Examiner* — James Lee
(74) *Attorney, Agent, or Firm* — Dickinson Wright, PLLC

(57) ABSTRACT

[Object] To provide an all-solid-state battery including an all-solid-state battery laminate which is covered with a resin layer, in which cracking of the resin layer due to changes in volume of the all-solid-state battery laminate can be prevented.

[Solution To Problem] Provided is an all-solid-state battery, including an all-solid-state battery laminate including at least one all-solid-state unit cell obtained by laminating a positive electrode current collector layer, a positive electrode active material layer, a solid electrolyte layer, a negative electrode active material layer, and a negative electrode current collector layer in this order, and a resin layer, wherein the resin layer covers at least the side surfaces of the all-solid-state battery laminate, and a cavity is present between the side surfaces of at least the negative electrode active material layer and the resin layer.

7 Claims, 5 Drawing Sheets

(51) Int. Cl.
*H01M 10/0565* (2010.01)
*H01M 50/183* (2021.01)
*H01M 10/0525* (2010.01)
*H01M 4/38* (2006.01)
*H01M 4/134* (2010.01)
*H01M 50/116* (2021.01)
*H01M 4/02* (2006.01)

(56) References Cited

U.S. PATENT DOCUMENTS

| | | | | |
|---|---|---|---|---|
| 2010/0075209 A1* | 3/2010 | Kimura | ............... | H01M 2/1072 |
| | | | | 429/92 |
| 2013/0323568 A1* | 12/2013 | Tanaka | ................... | H01M 2/08 |
| | | | | 429/130 |
| 2015/0236373 A1* | 8/2015 | Ohtomo | ................. | C03C 3/321 |
| | | | | 264/104 |
| 2017/0352923 A1 | 12/2017 | Iwano et al. | | |
| 2017/0373300 A1 | 12/2017 | Maeda et al. | | |
| 2018/0090766 A1* | 3/2018 | Ohsawa | ............... | H01M 4/625 |
| 2018/0212210 A1 | 7/2018 | Suzuki | | |

FOREIGN PATENT DOCUMENTS

| | | | |
|---|---|---|---|
| JP | 2008103284 | A | 5/2008 |
| JP | 2010056070 | A | 3/2010 |
| JP | 2014-060138 | A | 4/2014 |
| JP | 2017220447 | A | 12/2017 |
| JP | 2018116917 | A | 7/2018 |
| WO | 2016152565 | A1 | 9/2016 |

\* cited by examiner

ALL-SOLID-STATE BATTERY

FIELD

The present disclosure relates to an all-solid-state battery. In particular, the present disclosure relates to an all-solid-state battery including an all-solid-state battery laminate and a resin layer.

BACKGROUND

In recent years, various technologies for sealing a battery using a resin have been disclosed.

For example, Patent Literature 1 discloses a technology in which an all-solid-state battery element is covered with a casing composed of a thermosetting resin or a thermoplastic resin. Furthermore, Patent Literature 2 discloses a technology in which a battery body using an electrolytic solution is encapsulated with an uncured material such as a thermosetting resin, and thereafter, the uncured material is cured. Further, Patent Literature 3 discloses a technology in which an electrochemical device using an electrolytic solution is hermetically sealed in a rectangular parallelepiped box using a resin lid.

CITATION LIST

Patent Literature

[PTL 1] Japanese Unexamined Patent Publication (Kokai) No. 2000-106154
[PTL 2] Japanese Unexamined Patent Publication (Kokai) No. 2000-251858
[PTL 3] Japanese Unexamined Patent Publication (Kokai) No. 2014-060138

SUMMARY

Technical Problem

In all-solid-state batteries in which an all-solid-state battery laminate is covered with a resin layer, when changes in volume of the all-solid-state battery laminate occur during charging or discharging, cracks may form in the resin layer covering the all-solid-state battery laminate.

Thus, the present disclosure has been devised in view of the above circumstances and aims to provide an all-solid-state battery in which cracking of the resin layer due to changes in volume of the all-solid-state battery laminate can be prevented.

Solution to Problem

The inventor of the present disclosure have discovered that the above problem can be solved by the following means.

Aspect 1

An all-solid-state battery, comprising:
an all-solid-state battery laminate including at least one all-solid-state unit cell obtained by laminating a positive electrode current collector layer, a positive electrode active material layer, a solid electrolyte layer, a negative electrode active material layer, and a negative electrode current collector layer in this order, and
a resin layer,
wherein the resin layer covers at least the side surface of the all-solid-state battery laminate, and
wherein a cavity is present between the side surface of at least the negative electrode active material layer and the resin layer.

Aspect 2

The all-solid-state battery according to aspect 1, wherein the cavity is present only between the negative electrode active material layer and the resin layer.

Aspect 3

The all-solid-state battery according to aspect 1 or 2, wherein the width of the cavity between the side surface of the negative electrode active material layer and the resin layer is in the range of 2% to 20% of the width of the negative electrode active material layer.

Aspect 4

The all-solid-state battery according to any one of aspects 1 to 3, wherein the negative electrode active material layer comprises an alloy-based negative electrode active material.

Aspect 5

The all-solid-state battery according to aspect 4, wherein the alloy-based negative electrode active material comprises a Si alloy-based negative electrode active material.

Aspect 6

The all-solid-state battery according to any one of aspects 1 to 5, wherein a raw material of the resin layer is a thermosetting resin or a thermoplastic resin.

Aspect 7

The all-solid-state battery according to any one of aspects 1 to 6, wherein the all-solid-state battery laminate is restrained in the stacking direction.

Aspect 8

The all-solid-state battery according to aspect 7, wherein a restraining pressure of the restraining is 1.0 MPa or more.

Aspect 9

The all-solid-state battery according to any one of aspects 1 to 8,
wherein the resin layer covers the entirety of the all-solid-state battery laminate, and
wherein the positive electrode current collector layer is provided with a positive electrode current collector tab electrically connected thereto and the negative electrode current collector layer is provided with a negative electrode current collector tab electrically connected thereto, and these current collector tabs protrude from the resin layer.

Advantageous Effects of Invention

According to the present disclosure, in the all-solid-state battery in which the all-solid-state battery laminate is covered by the resin layer, cracking of the resin layer due to changes in volume of the all-solid-state battery laminate can be prevented.

DESCRIPTION OF EMBODIMENTS

Figure 1:
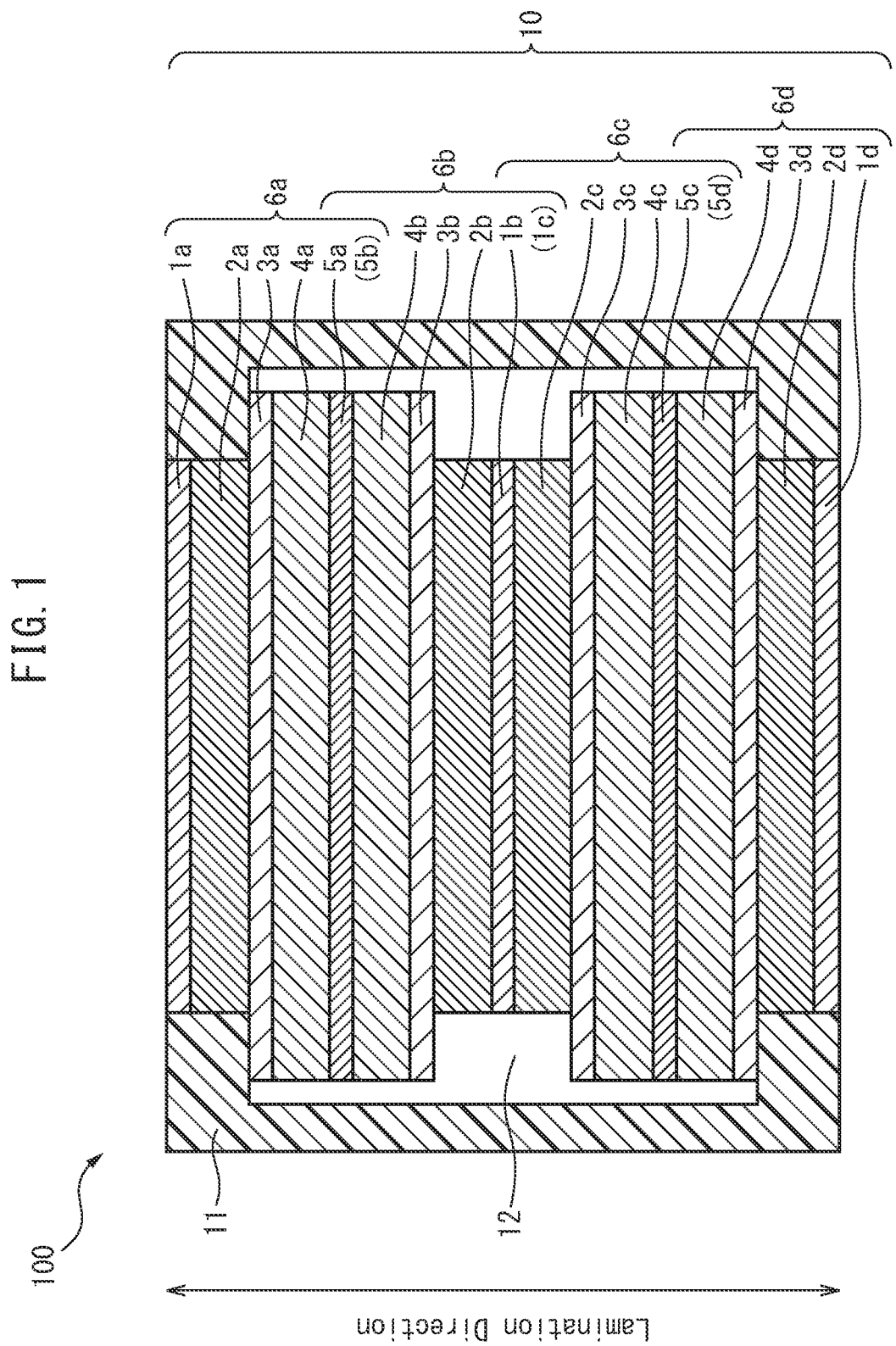
FIG. 1 is a schematic cross-sectional view in the lamination direction showing an example of the all-solid-state battery f the present disclosure.

The embodiments for carrying out the present disclosure will be explained in detail below with reference to the drawings. Note that, for the convenience of explanation, the same or corresponding components in the drawings are assigned the same reference numerals and redundant explanations therefor have been omitted. Not all of the constituent elements of the embodiments are necessarily indispensable, and some constituent elements may be omitted in some cases. The embodiments shown in the drawings below are examples of the present disclosure. The present disclosure is not limited thereby.

All-Solid-State Battery

The all-solid-state battery of the present disclosure comprises: an all-solid-state battery laminate including at least one all-solid-state unit cell obtained by laminating a positive electrode current collector layer, a positive electrode active material layer, a solid electrolyte layer, a negative electrode active material layer, and a negative electrode current collector layer in this order, and
a resin layer,
wherein the resin layer covers at least the side surface of the all-solid-state battery laminate, and
wherein a cavity is present between the side surface of at least the negative electrode active material layer and the resin layer.

FIG. 1 is a schematic cross-section view showing an example of the all-solid-state battery of the present disclosure. The all-solid-state battery 100 of the present disclosure includes an all-solid-state battery laminate 10 and a resin layer 11. The resin layer 11 is covering the side surface of the all-solid-state battery laminate 10. Furthermore, a cavity 12 is present between the side surface from the solid electrolyte layer 3a to the solid electrolyte layer 3d and the resin layer 11, in the lamination direction.

Figure 2:
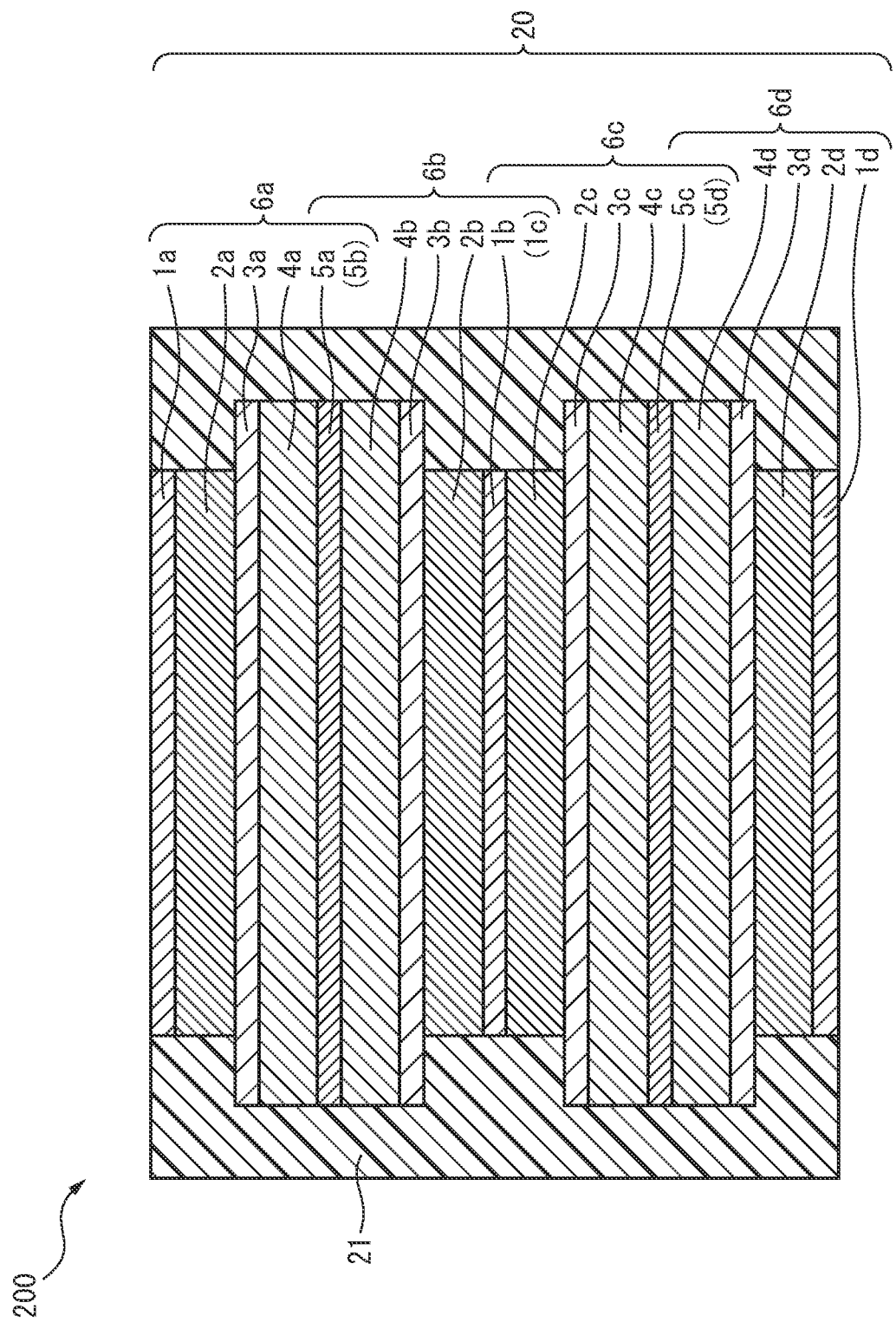
FIG. 2 is a schematic cross-sectional view in the lamination direction showing an example of a conventional all-solid-state battery.

In a conventional all-solid-state battery, which is covered with a resin layer as described above, when the all-solid-state battery laminate and the resin layer are in close contact, there is a risk that the resin layer, which is in close contact with the all-solid-state battery laminate, will become deformed, thereby cracking the resin layer, due to the change in volume of the all-solid-state battery laminate (in particular, the change in volume of the alloy-based negative electrode active material layer). For example, in the conventional all-solid-state battery 200 shown in FIG. 2, the all-solid-state battery laminate 20 and the resin layer 21 are in close contact. In this case, particularly the alloy-based negative electrode active material layer expands and contracts largely due to charging and discharging. As a result, there is a risk that cracks may form in the resin layer 21.

Conversely, in the all-solid-state battery of the present disclosure, since a cavity is present between the side surface of the at least the negative electrode active material layer and the resin layer, even if the volume of the negative electrode active material layer changes, deformation of the resin layer can be prevented, whereby the formation of cracks in the resin layer can be prevented.

Cavity

The cavity, which is a characteristic of the all-solid-state battery of the present disclosure, will be explained in greater detail below.

In the present disclosure, "cavity" means a clearance between the all-solid-state battery laminate, which is covered with the resin layer, and the resin layer. In the present disclosure, such a cavity is present between the side surface of at least the negative electrode active material layer and the resin layer. In other words, in the all-solid-state battery of the present disclosure, at least the negative electrode active material layer is not in contact with the resin layer.

Figure 3:
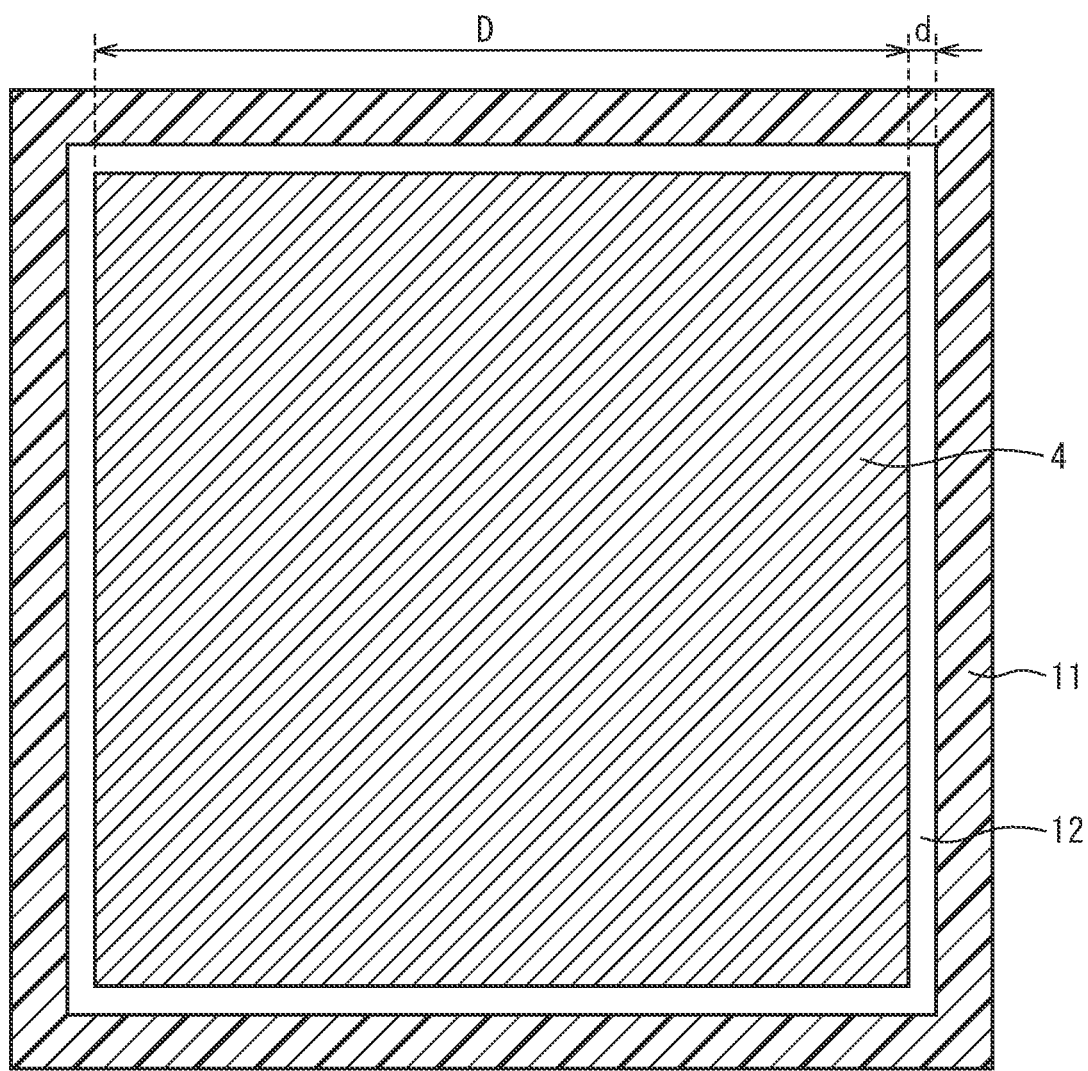
FIG. 3 is a schematic cross-sectional view in the surface direction showing an example of the all-solid-state battery of the present disclosure.

The relationship between the negative electrode active material layer and the resin layer of the all-solid-state battery of the present disclosure is shown in FIG. 3. FIG. 3 is a schematic cross-sectional view in the surface direction of an example of the all-solid-state battery of the present disclosure. As shown in FIG. 3, the negative electrode active material 4 and the resin layer 11 do not contact, and the cavity 12 is present between the negative electrode active material layer 4 and the resin layer 11. Note that, in order to describe the cavity present between the negative electrode active material layer and the resin layer, FIG. 3 is a cross-sectional view of the all-solid-state battery cut in the surface direction of the negative electrode active material layer portion.

In the present disclosure, the width of the cavity between the side surface of the negative electrode active material layer and the resin layer is not particularly limited, and may be, for example, 2% or more or 3% or more of the width of the negative electrode active material layer, and 20% or less, 18% or less, or 15% or less of the width of the negative electrode active material layer. Such a range is preferable from the viewpoint of securing a clearance for expansion of the negative electrode active material layer in well-balance with the energy density, etc., of the all-solid-state battery and the like. Note that the "width of the cavity between the side surface of the negative electrode active material layer and the resin layer" means the shortest distance between any edge of the side surface of the negative electrode active material layer and the resin layer. Furthermore, the "width of the negative electrode active material layer" means the distance from one edge side of the negative electrode active material layer to the other edge side opposite thereto. For example, in FIG. 3, the width of the cavity 12 between the side surface of the negative electrode active material layer 4 and the resin layer 11 is represented by d and the width of the negative electrode active material layer 4 is represented by D.

Figure 4:
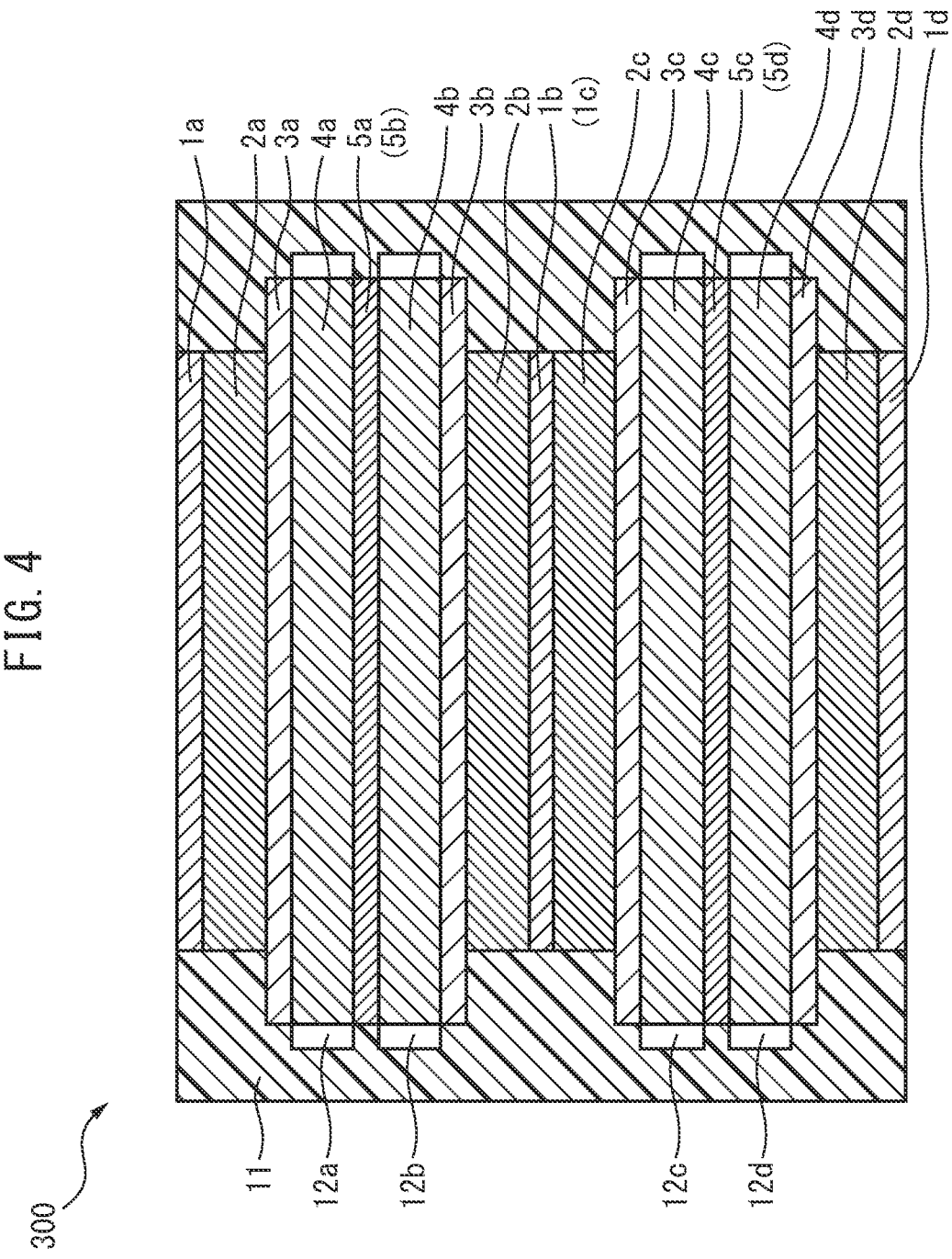
FIG. 4 is a schematic cross sectional-view in the lamination direction showing an example of the all-solid-state battery of the present disclosure.

In the present disclosure, from the viewpoint of improving the sealability by the resin layer, such cavity is preferably present only between the negative electrode active material layer and the resin layer. For example, FIG. 4 is a schematic cross-sectional view showing an example of the all-solid-state battery of the present disclosure. In the all-solid-state battery 300, cavities 12a, 12b, 12c, and 12d are present only between the side surfaces of the respective negative electrode active material layers 4a, 4b, 4c, and 4d and the resin layer 11. However, these cavities may be present over substantially all of the all-solid-state battery laminate, for example, between the whole of the all-solid-state battery laminate except for the current collector layers at both ends thereof and the resin layer.

All-Solid-State Battery Type

In the present disclosure, the type of the all-solid-state battery can be an all-solid-state lithium battery, an all-solid-state sodium battery, an all-solid-state magnesium battery, or an all-solid-state calcium battery. From among these, an all-solid-state lithium battery or an all-solid-state sodium battery is preferable and an all-solid-state lithium battery is particularly preferable. Furthermore, the all-solid-state battery of the present disclosure may be a primary battery or may be a secondary battery. From among these, a secondary battery is preferable, since secondary batteries can be repeatedly charged and discharged and can be used as, for example, in-vehicle batteries.

All-Solid-State Battery Laminate

In the present disclosure, the all-solid-state battery laminate can include one or more all-solid-state unit cells. For example, in FIG. 1, the all-solid-state battery laminate 10 of the present disclosure includes the all-solid-state unit cells 6a, 6b, 6c, and 6d. Furthermore, in the present disclosure, the all-solid-state unit cell is obtained by laminating a positive electrode current collector layer, a positive electrode active material layer, a solid electrolyte layer, a negative electrode active material layer, and a negative electrode current collector layer in this order.

In the all-solid-state battery of the present disclosure, the all-solid-state battery laminate may be restrained in the lamination direction.

Figure 5:
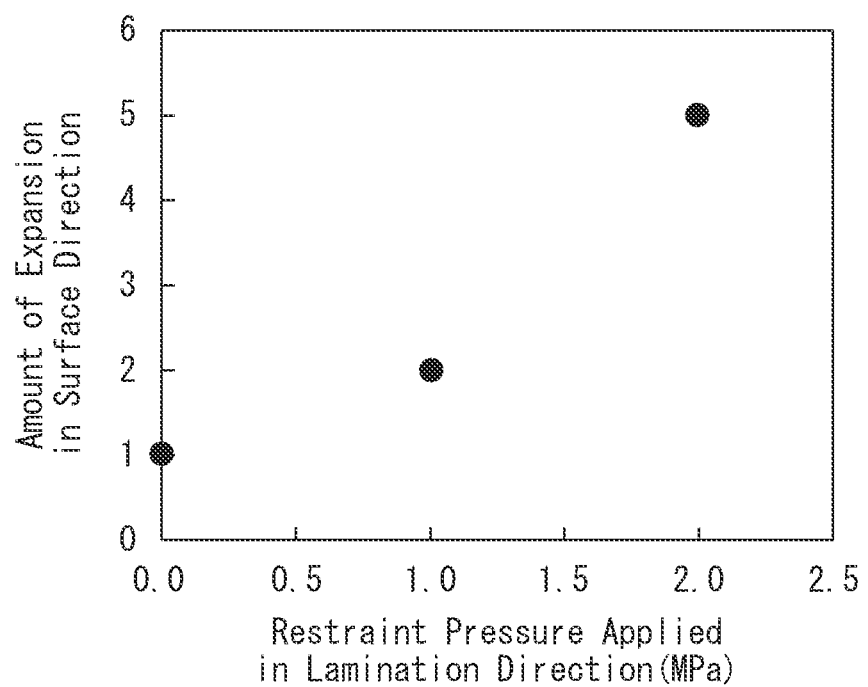
FIG. 5 is a view showing the relationship between the restraint pressure applied in the lamination direction of the all-solid-state battery laminate and the amount of expansion in the surface direction.

When the all-solid-state battery laminate is charged or discharged while being restrained in the lamination direction, the relationship between the restraint pressure (MPa) in the lamination direction and the amount of expansion of the negative electrode active material layer in the surface direction (the direction perpendicular to the lamination direction) is shown in FIG. 5. Specifically, given that, when the restraint pressure in the lamination direction of the all-solid-state battery laminate is 0 MPa, i.e., when the all-solid-state battery laminate is not substantially restrained, if the rate of expansion of the negative electrode active material layer in the surface direction when charging and discharging is the baseline (1); the expansion rate of the negative electrode active material layer in the surface direction is the twofold of the baseline, when charging and discharging with the restraint pressure being set to 1.0 MPa, and the expansion rate in the surface direction of the negative electrode active material layer is multiplied five times of the baseline, when charging and discharging with the restraint pressure being set to 2.0 MPa. Namely, it is suggested that as the restraint pressure in the lamination direction with respect to the all-solid-state battery laminate increases, the amount of expansion of the negative electrode active material layer in the surface direction increases during charging and discharging. Note that, the relationship shown in FIG. 5 was obtained by measurement using a Si alloy-based negative electrode active material layer.

In contrast to the result of FIG. 5, in the all-solid-state battery of the present disclosure, since a cavity is present between the side surface of at least the negative electrode active material layer and the resin layer, the all-solid-state battery laminate is restrained in the lamination direction, whereby even if the expansion amount of the negative active material layer is large in the surface direction, a clearance into which the negative electrode active material layer can expand can be secured. In other words, when the all-solid-state battery laminate is restrained in the lamination direction, the effect of the present disclosure can be more remarkably exhibited. Furthermore, such restraint pressure is not particularly limited and may be, for example 1.0 MPa or more, 1.5 MPa or more, 2.0 MPa or more, or 2.5 MPa or more. Note that, the upper limit of the restraint pressure is not particularly limited and may be, for example, 50 MPa or less.

When the all-solid-state battery laminate of the present disclosure includes two or more all-solid-state unit cells, the two all-solid-state unit cells, which are adjacent in the lamination direction, may be of a monopolar-type sharing a positive and/or negative electrode current collector layer. Thus, for example, the all-solid-state battery laminate may be a laminated body of four all-solid-state unit cells sharing positive electrode current collector layers and negative electrode current collector layers.

More specifically, as shown in, for example, FIG. 1, the all-solid-state battery laminate 10 can include, in this order, a positive electrode current collector layer 1a, a positive electrode active material layer 2a, a solid electrolyte layer 3a, a negative electrode active material layer 4a, a negative electrode current collector layer 5a (5b), a negative electrode active material layer 4b, a solid electrolyte layer 3b, a positive electrode active material layer 2b, a positive electrode current collector layer 1b (1c), a positive electrode active material layer 2c, a solid electrolyte layer 3c, a negative electrode active material layer 4c, a negative electrode current collector layer 5c (5d), a negative electrode active material layer 4d, a solid electrolyte layer 3d, a positive electrode active material layer 2d, and a positive electrode current collector layer 1d, Furthermore, when the all-solid-state battery laminate includes two or more all-solid-state unit cells, the two all-solid-state unit cells, which are adjacent in the lamination direction, may be of a bipolar-type sharing a positive/negative electrode current collector layer, which is used as both positive electrode and negative electrode current collector layers. Thus, for example, the all-solid-state battery laminate may be a laminated body of three all-solid-state unit cells sharing positive/negative electrode current collector layers, which are used as both positive and negative electrode current collector layers. Specifically, the all-solid-state battery laminate can include, in this order, a positive electrode current collector layer, a positive electrode active material layer, a solid electrolyte layer, a negative electrode active material layer, a positive/negative electrode current collector layer, a positive electrode active material layer, a solid electrolyte layer, a negative electrode active material layer, a positive/negative electrode current collector layer, a positive electrode active material layer, a solid electrolyte layer, a negative electrode active material layer, and a negative electrode current collector layer.

Furthermore, the all-solid-state battery of the present disclosure may include a positive electrode current collector tab, which is electrically connected to the positive electrode current collector layer, and a negative electrode current collector tab, which is electrically connected to the negative electrode current collector layer. In this case, in the all-solid-state battery of the present disclosure, the resin layer covers the entirety of the all-solid-state battery laminate and the positive electrode current collector layer is provided with a positive electrode current collector tab electrically connected thereto and the negative electrode current collector layer is provided with a negative electrode current collector tab electrically connected thereto, and these current collector tabs may protrude from the resin layer. According to this configuration, the power generated by the all-solid-state battery laminate can be extracted to the outside via the collector tabs.

Furthermore, the positive electrode current collector layer may include positive current collector protruding parts which protrude in the surface direction, and these positive current collector protruding parts may be electrically connected to the positive electrode current collector tab. Likewise, the negative electrode current collector layer may include negative current collector protruding parts, which protrude in the surface direction, and these negative current collector protruding parts may be electrically connected to the negative electrode current collector tab.

Positive Electrode Current Collector Layer

The conductive material used in the positive electrode current collector layer is not particularly limited and any known conductive material which can be used in an all-solid-state battery can be suitably used. For example, the conductive material used in the positive electrode current collector layer may be SUS, aluminum, copper, nickel, iron, titanium, carbon, or the like. However, the conductive material is not limited thereto.

The form of the positive electrode current collector layer of the present disclosure is not particularly limited, and can be, for example, a foil, a plate, a mesh, or the like. From among these, a foil is preferable.

Positive Electrode Active Material Layer

The positive electrode active material layer includes at least a positive electrode active material, and preferably further includes a solid electrolyte, which will be described later. In addition thereto, an additive which is used in the positive electrode active material layer of an all-solid-state battery, such as, for example, a conductive aid or a binder, can be included in accordance with the intended use or application.

The material of the positive electrode active material used in the present disclosure is not particularly limited and any known material can be used. For example, the positive electrode active material may be lithium cobalt oxide (LiCoO$_2$), lithium nickel oxide (LiNiO$_2$), lithium manganate (LiMn$_2$O$_4$), LiNi$_{1/3}$Mn$_{1/3}$Co$_{1/3}$O$_2$ or a heterogeneous element substituent having a Li—Mn spinel structure represented by Li$^{1+x}$Mn$_{2-x-y}$M$_y$O$_4$ (wherein M is at least one metal element selected from Al, Mg, Co, Fe, Ni and Zn). However, the material of the positive electrode active material layer is not limited thereto.

The conductive aid is not particularly limited and any known conductive aid can be used. For example, the conductive aid may be a carbon material such as VGCF (vapor grown carbon fiber) or carbon nanofibers or a metal material. However, the conductive aid is not limited thereto.

The binder is not particularly limited and any known binder can be used. For example, the binder may be materials such as polyvinylidene fluoride (PVdF), carboxymethyl cellulose (CMC), butadiene rubber (BR), styrene butadiene rubber (SBR) or combinations thereof. However, the binder is not limited thereto.

Solid Electrolyte Layer

The solid electrolyte layer includes at least a solid electrolyte. The solid electrolyte is not particularly limited and any material commonly used as the solid electrolyte in all-solid-state batteries can be used. For example, the solid electrolyte may be a known sulfide solid electrolyte or a known oxide solid electrolyte. However, the solid electrolyte is not limited thereto.

As examples of the sulfide solid electrolyte, sulfide-based amorphous solid electrolytes such as, for example, Li$_2$S—SiS$_2$, LiI—Li$_2$S—SiS$_2$, LiI—Li$_2$S—P$_2$S$_5$, LiI—LiBr—Li$_2$S—P$_2$S$_5$, Li$_2$S—P$_2$S$_5$—LiI—LiBr, Li$_2$S—P$_2$S$_5$—GeS$_2$, LiI—Li$_2$S—P$_2$O$_5$, LiI—Li$_3$PO$_4$—P$_2$S$_5$, and Li$_2$S—P$_2$S$_5$; sulfide-based crystalline solid electrolytes such as, for example, Li$_{10}$GeP$_2$S$_{12}$, Li$_7$P$_3$S$_{11}$, Li$_3$PS$_4$, and Li$_{3.25}$P$_{0.75}$S$_4$; or combinations thereof can be used.

As examples of the oxide solid electrolyte, polyethylene oxide (PEO), polypropylene oxide (PPO), or copolymers thereof can be used. However, the oxide solid electrolyte is not limited thereto.

The solid electrolyte may be a glass or a crystallized glass (glass ceramic). Furthermore, in addition to the above-described solid electrolytes, the solid electrolyte layer may include a binder as necessary. Specific examples thereof are the same as the "binders" described above for the "positive electrode active material layer", and thus, a description thereof has been omitted.

Negative Electrode Active Material Layer

The negative electrode active material layer includes at least a negative electrode active material and preferably further includes a solid electrolyte as described above. In addition thereto, depending on the purpose or application thereof, for example, additives commonly used in the negative electrode active material layer of all-solid-state batteries, such as a conductive aid or binder, can be included.

In the present disclosure, the material of the negative electrode active material is not particularly limited. The material is preferably capable of occluding and releasing metal ions such as lithium ions. For example, the negative electrode active material may be an alloy-based negative electrode active material or a carbon material. However, the material of the negative electrode active material layer is not limited thereto.

Though alloy-based negative electrode active materials have a high discharge capacity, they have a large volume change (expansion and contraction) accompanying the occlusion and release of lithium ions. Thus, there is a problem that relatively large stresses are generated during volume changes. Regarding this problem, as described above, since the present disclosure includes a cavity between the side surface of at least the negative electrode active material layer and the resin layer, even if the volume of the alloy-based negative electrode active material changes, cracking of the resin layer can be prevented. In other words, if the negative electrode active material layer includes an alloy-based negative electrode active material, the effect of the present disclosure can be more remarkably exhibited.

The alloy-based negative electrode active material is not particularly limited, and, for example, a Si alloy-based negative electrode active material or a Sn alloy-based negative electrode active material can be used. The Si alloy-based negative electrode active material can be silicon, silicon oxide, silicon carbide, silicon nitride, or a solid solution thereof. Furthermore, the Si alloy-based negative electrode active material can include an element other than silicon, such as, for example, Fe, Co, Sb, Bi, Pb, Ni, Cu, Zn, Ge, In, Sn, or Ti. The Sn alloy-based negative electrode active material can be tin, tin oxide, tin nitride, or a solid solution thereof. Furthermore, the Sn alloy-based negative electrode active material can include an element other than tin, such as, for example, Fe, Co, Sb, Bi, Pb, Ni, Cu, Zn, Ge, In, Ti, or Si.

Among these alloy-based negative electrode active materials, an Si alloy-based negative electrode active material is preferable.

The carbon material is not particularly limited and can be, for example, a hard carbon, a soft carbon, or graphite.

Regarding the solid electrolyte and other additives such as the conductive aid and binder used in the negative electrode active material layer, those described above in the sections "positive electrode active material layer" and "solid electrolyte layer" can be appropriately used.

Negative Electrode Current Collector Layer

The conductive material used in the negative electrode current collector layer is not particularly limited and any known conductive material which can be used in an all-solid-state battery can be suitably used. For example, the conductive material used in the negative electrode current collector layer may be SUS, aluminum, copper, nickel, iron, titanium, carbon, or the like. However, the conductive material is not limited thereto.

The form of the negative electrode current collector layer of the present disclosure is not particularly limited, and can be, for example, a foil, a plate, a mesh, or the like. From among these, a foil is preferable.

Resin Layer

In the present disclosure, the resin layer covers the side surface of at least the all-solid-state battery laminate. As a result, it is not necessary to include a casing such as a laminate film or a metal can on the outside of the all-solid-state battery of the present disclosure. Thus, the all-solid-state battery of the present disclosure is more compact than conventional all-solid-state batteries that require a casing, which also leads to an improvement in battery energy density.

For example, as in the all-solid-state battery 100 shown in FIG. 1, the upper end surface and the lower end surface in the lamination direction are the positive electrode current collector layers 1a and 1d, and only the side surface of the all-solid-state battery laminate 10 are covered by the resin layer 11. Depending on the lamination order of the all-solid-state battery laminate, the upper end surface and the lower end surface in the lamination direction may not be limited to positive electrode current collector layers but may be negative electrode current collector layers.

Furthermore, the all-solid-state battery of the present disclosure may be an all-solid-state battery in which the upper end surface and the lower end surface in the lamination direction of the all-solid-state battery laminate are covered by a film or the like and the side surface of at least the all-solid-state battery laminate are covered by the resin layer. Moreover, the all-solid-state battery of the present disclosure may be an all-solid-state battery in which the upper end surface and/or the lower end surface is covered by the resin layer.

In the present disclosure, the material of the resin layer is not particularly limited. The material of the resin layer may be the same as the insulating resin material used in typical all-solid-state batteries. For example, the raw material of the resin layer may be a thermosetting resin or a thermoplastic resin. More specifically, the raw material of the resin layer may be, for example, an epoxy resin, an acrylic resin, a polyimide resin, a polyester resin, a polypropylene resin, a polyamide resin, a polystyrene resin, a polyvinyl chloride resin, or a polycarbonate resin. However, the material of the resin layer is not limited thereto.

REFERENCE SIGNS LIST

1a, 1b, 1c, 1d positive electrode current collector layer
2a, 2b, 2c, 2d positive electrode active material layer
3a, 3b, 3c, 3d solid electrolyte layer
4, 4a, 4b, 4c, 4d negative electrode active material layer
5a, 5b, 5c, 5d negative electrode current collector layer
6a, 6b, 6c, 6d all-solid-state unit cell
10, 20 all-solid-state battery laminate
11, 21 resin layer
12, 12a, 12b, 12c, 12d cavity
100, 200, 300 all-solid-state battery

The invention claimed is:

1. An all-solid-state battery, comprising:
   an all-solid-state battery laminate including at least one all-solid-state unit cell obtained by laminating a positive electrode current collector layer, a positive electrode active material layer, a solid electrolyte layer, a negative electrode active material layer, and a negative electrode current collector layer in this order, and
   a resin layer,
   wherein the resin layer covers at least a side surface of the all-solid-state battery laminate,
   wherein a cavity is present between the entire negative electrode active material layer and the resin layer, and
   wherein the all-solid-state battery laminate is restrained in the stacking direction.

2. The all-solid-state battery according to claim 1, wherein the width of the cavity between a side surface of the negative electrode active material layer and the resin layer is in the range of 2% to 20% of a width of the negative electrode active material layer.

3. The all-solid-state battery according to claim 1, wherein the negative electrode active material layer comprises an alloy-based negative electrode active material.

4. The all-solid-state battery according to claim 3, wherein the alloy-based negative electrode active material comprises a Si alloy-based negative electrode active material.

5. The all-solid-state battery according to claim 1, wherein a raw material of the resin layer is a thermosetting resin or a thermoplastic resin.

6. The all-solid-state battery according to claim 1, wherein a restraining pressure of the restraining is 1.0 MPa or more.

7. An all-solid-state battery, comprising:
an all-solid-state battery laminate including at least one all-solid-state unit cell
obtained by laminating a positive electrode current collector layer, a positive electrode active
material layer, a solid electrolyte layer, a negative electrode active material layer, and a negative
electrode current collector layer in this order, and
a resin layer,
wherein a cavity is present between the negative electrode active material layer and the resin layer,
wherein the resin layer covers the entirety of the all-solid-state battery laminate, and
wherein the positive electrode current collector layer is provided with a positive electrode current collector tab electrically connected thereto and the negative electrode current collector layer is provided with a negative electrode current collector tab electrically connected thereto, and these current collector tabs protrude from the resin layer.

\* \* \* \* \*